United States Patent [19]

Minamida et al.

[11] 4,377,735
[45] Mar. 22, 1983

[54] LASER WORKING TREATMENT PROCESS CAPABLE OF CONTROLLING THE FORM OF HEATED PORTION OF A STEEL MATERIAL

[75] Inventors: Katsuhiro Minamida, Yokohama; Shigehiro Yamaguchi, Fujisawa, both of Japan

[73] Assignee: Nippon Steel Corporation, Tokyo, Japan

[21] Appl. No.: 268,651

[22] Filed: May 28, 1981

[51] Int. Cl.$^3$ .................................................. B23K 27/00
[52] U.S. Cl. ........................ 219/121 LM; 219/121 L; 219/121 LD; 219/121 FS; 219/121 LC
[58] Field of Search ..... 219/121 LM, 121 L, 121 LC, 219/121 LD, 121 FS, 121 LG, 121 LN

[56] References Cited
U.S. PATENT DOCUMENTS

| | | | |
|---|---|---|---|
| 4,127,761 | 11/1978 | Pauley et al. | 219/121 FS |
| 4,167,662 | 9/1979 | Steen | 219/121 LD X |
| 4,220,842 | 9/1980 | Sturmer et al. | 219/121 FS X |

*Primary Examiner*—C. L. Albritton
*Attorney, Agent, or Firm*—Kenyon & Kenyon

[57] ABSTRACT

A steel material is treated by laser beams, in such a manner that the laser beams and a gas jet are concurrently projected to a working point of the steel material to produce a plasma around the working point and another gas jet is ejected to the working point at an oblique angle to the projecting direction of the laser beams so as to press the plasma against the steel material surface, whereby the form of the plasma can be controlled by changing the oblique angle of the another gas jet ejection.

6 Claims, 15 Drawing Figures

Fig. 5a   Fig. 5b   Fig. 5c
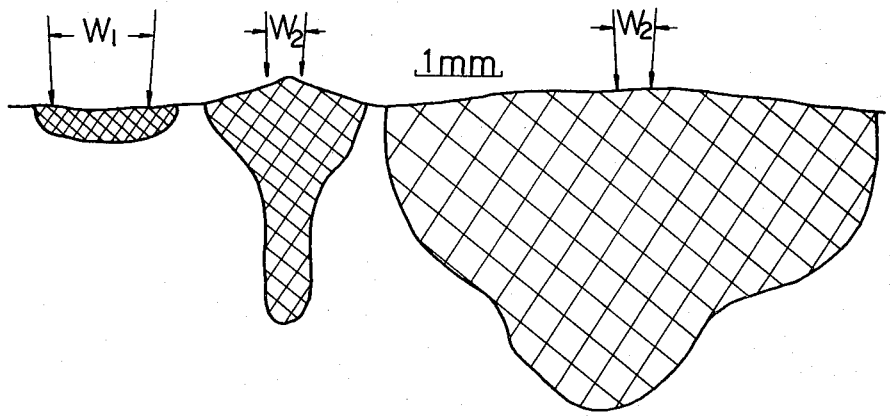
Fig. 6a
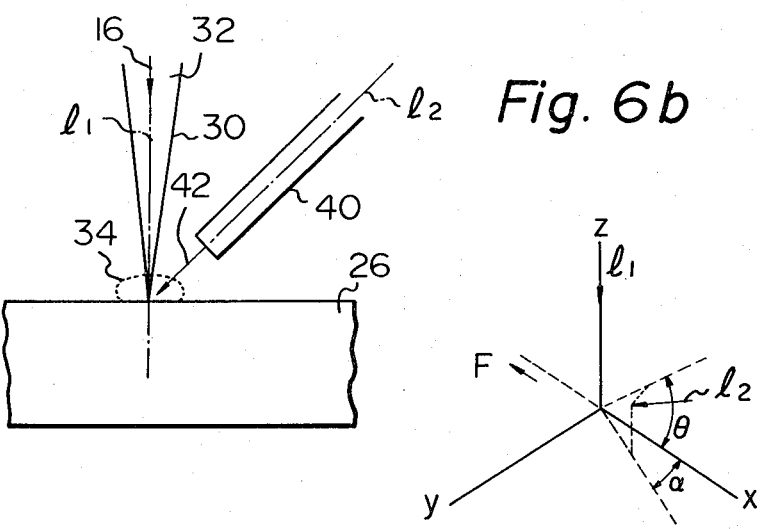
Fig. 6b

LASER WORKING TREATMENT PROCESS CAPABLE OF CONTROLLING THE FORM OF HEATED PORTION OF A STEEL MATERIAL

FIELD OF THE INVENTION

The present invention relates to a process applying such as welding, hardening, drilling or cutting a steel material by using laser beams.

BACKGROUND OF THE INVENTION

As is already known, laser beams have a very high energy density. The energy density of the laser working process may easily reach at least one hundred thousand times that of an arc welding process. For example, an oxi-acetylene flame exhibits an energy density of about $10^3$ W/cm$^2$ and an argon arc (200 A) exhibits an energy density of about $1.5 \times 10^4$ W/cm$^2$. Contrary to this, electron beams exhibit an energy density of about $10^9$ W/cm$^2$ and continuous laser beams exhibit an energy density of $10^9$ W/cm$^2$. In addition, the energy density of pulse lasers amounts to $10^{13}$ W/cm$^2$. The use of beams having such a high energy density makes it possible to effect easily operations, such as surface quenching, welding, piercing or cutting, of a steel material. The surface quenching, welding or drilling of the steel material is carried out in correspondence with the energy density to be applied thereto. That is, for surface quenching, an energy density of about $1.8 \times 10^1$ J/cm$^2$ is used, for melting (welding), an energy density of about $1.9 \times 10^3$ J/cm$^2$ is used, and for vaporization (drilling, cutting), an energy density of about $4.9 \times 10^4$ J/cm$^2$ is used. In other words, when an energy input within a predetermined period of time is low, no melting of the steel material occurs, and, instead thereof, the surface of the steel material is quenched due to a rapid heating and cooling effect. On the other hand, as the energy input is increased, the steel material begins to fuse and, finally, the vaporization of the melted steel takes place.

Generally, when laser beams are applied at an energy density of $10^6$ W/cm$^2$ onto a metal article, the surface temperature of the article increases to the evaporation temperature of the article within a period of about 1 microsecond, so as to evaporate the surface portion of the article. However, in this extremely short period of time, substantially no heat is absorbed by the inside portion of the article and substantially no increase in temperature of the inside portion of the article occurs. Also, when the surface portion of the article is vaporized away, the subsurface layer becomes a fresh surface layer of the article and, then, the fresh surface layer is evaporated away. In this manner, the article can be drilled or cut by the laser beams.

In the case where the laser beams are applied at an energy density of $10^5$ W/cm$^2$ or less onto a metal article, a period of several milliseconds is necessary to elevate the surface temperature of the article to the vaporization temperature thereof. During this relatively long period of time, the under-lying layer of the article reaches a melting temperature thereof. Accordingly, the welding procedure can be accomplished by adequately controlling the time period of irradiation of the laser beams and by stopping the laser beam irradiation before the surface of the article to be vaporized.

SUMMARY OF THE INVENTION

An object of the present invention is to provide a laser working treatment process capable of applying a desired metal-working procedure onto a steel material, while controlling the form of a heated portion of the steel material.

Another object of the present invention is to provide a laser working treatment process capable of welding a steel material by controlling the form of a melted portion of the material so as to make the heat-affected portion in the weld as small as possible and to eliminate the weak effects of the welding porcess from the welded material.

Still another object of the present invention is to provide a laser working treatment process capable of surface quenching a steel material while controlling the depth of the quenched portion of the steel material.

The above-mentioned objects can be attained by the process of the present invention which comprises irradiating laser beams to a working point of a steel material, while ejecting a jet of gas coaxially with the laser beams toward the working point, to cause a plasma to be generated around the working point, and ejecting another jet of gas toward the working point at an oblique angle to the irradiating direction of the laser beams, thereby pressing the plasma against the steel material.

The form of the plasma can be modified by changing the ejecting direction of the plasma-pressing gas jet. The modification in the form of the plasma causes changes in the form of the heated portion of the steel material. This phenomenon can be utilized to improve the working procedure for the steel material by using the laser beams.

BRIEF DESCRIPTION OF THE DRAWINGS

FIG. 5(a) is a schematic diagram of a fused portion obtained by laser beam irradiation without the use of a gas;

FIGS. 5(b) and 5(c) are schematic diagrams of fused portions obtained by laser beam irradiation in combination with a gas jetting in accordance with the process of the present invention.

FIG. 6(a) is an explanatory diagram illustrating a laser welding procedure according to the process of the present invention;

FIG. 6(b) is a diagram illustrating an inclination angle at which a gas jet is ejected;

DETAILED DESCRIPTION OF THE INVENTION

In the process of the present invention, it is essential that gas from a jet is ejected toward a working point of a steel material, which irradiating laser beams to the working point so as to create plasma. The gas jet is effective for creating a plasma around the working point and pressing the plasma against the steel material. Also, the ejecting direction of the gas jet toward the working point is variable. That is, by varying the ejecting direction of the gas jet, the form of the heated portion of the steel material can be controlled.

Figure 1:
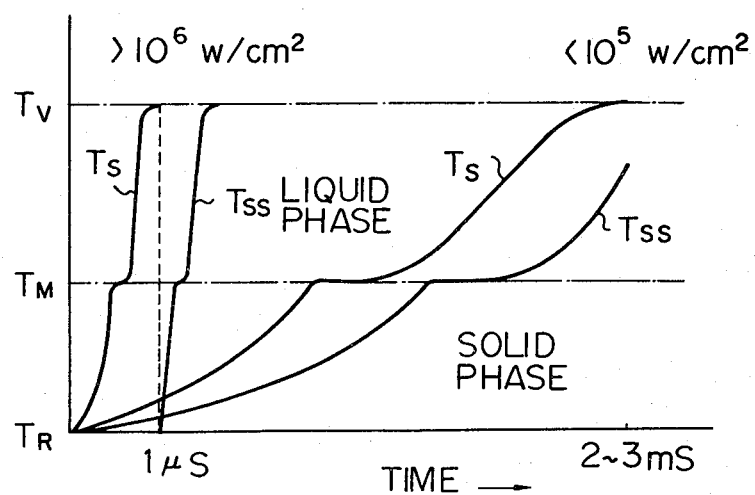
FIG. 1 is a graph illustrating a relationship between a change in the surface temperature Ts of the surface layer and the surface temperature Tss of a material to be worked, and the lapse of time, when the material is irradiated with laser beams.

FIG. 1 shows the relationship between the temperature Ts of the surface layer and the temperature Tss of the subsurface layer of a steel material, and the irradiation time of laser beams on the steel material. Referring to FIG. 1, when the laser beams have a great energy density of $10^6$ W/cm$^2$ or more, the surface layer of the steel material reaches the vaporization temperature thereof or above, whithin the period of one microsecond and, then, is vaporized away from the steel material. In this case, since the irradiating time is extremely short, the subsurface layer can absorb a little energy from the surface layer and, therefore, the incease in the temperature of the subsurface layer is extremely small. However, the vaporization of the surface layer causes the subsurface layer to become a fresh surface layer of the steel material, and, then, the fresh surface layer is vaporized away by the irradiation of the laser beams.

In the case where the laser beams are irradiated at a low energy density of $10^5$ W/cm$^2$ or less, it is necessary to continue the laser beam irradiation to the steel material for several milliseconds in order to elevate the temperature of the surface layer to the vaporization temperature Tv thereof. During this relatively long irradiation time period, the temperature of the subsurface layer increases and reaches the melting temperature TM thereof. In this case, the temperature of the subsurface layer can reach its melting temperature TM before the temperature of the surface layer reaches its vaporization temperature TV. This phenomenon allows the steel material to be welded by controlling the energy density and irradiation time of the laser beams. In FIG. 1, TR represents room temperature.

Figure 2:
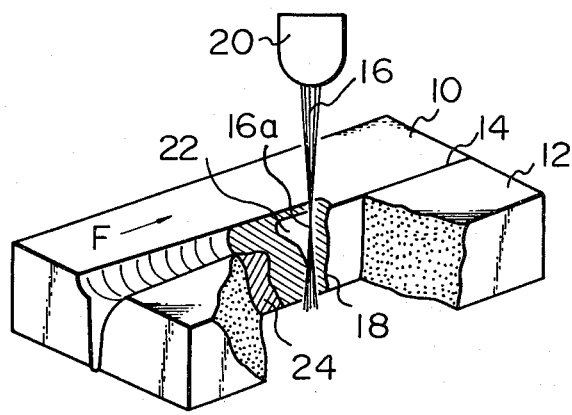
FIG. 2 is a schematic diagram for illustrating a conventional laser welding procedure.

Referring to FIG. 2, base materials 10 and 12 are subjected to a butt welding procedure. That is, base materials 10 and 12 are welded at butted surface 14 therebetween, by downwardly irradiating laser beams 16 from a CO$_2$ laser beam source 20 located right over the butted surface 14.

In the case where welding is carried out by means of energy beams such as laser beams or electron beams, a welding groove is not particularly formed in the base materials, and the butted surface 14 itself is the portion to be welded. The laser beams are irradiated so as to converge into that portion so as to focus on the point 16a. When irradiated with the laser beams, a deep hole 22 having a small diameter is formed in the irradiated portion of the butted surface. This hole is called a key hole. The surrounding area around the key hole 22 is melted so as to form a fused portion 18. As the laser beams 16 and the base materials 10 and 12 are moved relative to each other, the key hole 22 is moved, accordingly. Along with the movement of the key hole 22, the fused portion 18 is moved while the preceding melted portion is solidified to form a bead 24. As such a phenomenon proceeds along the butted surface 14, welding is effected. In FIG. 2, the welding procedure is carried out in the welding direction indicated by the arrow F. When the laser beams 16 are moved to effect the welding, the arrow F represents the direction of movement of the laser beams 16. On the other hand, when the base materials are moved to effect the welding, the base materials are moved in the direction opposite the arrow F.

The factors influencing the laser beam welding procedure include (1) the laser power, (2) the energy density of laser beams, (3) the laser energy absorbability of the surface of the materials, (4) the thermal conductivity and thermal diffusion ratio of the base materials, and (5) the specific heat, density, heat capacity, fusing temperature and heat of melting of the base materials. Particularly, the factor (3), that is, the laser energy absorbability of the surface of the materials is important. In the case where the surfaces of the base material have a high reflectance to laser beams, the irradiated, laser beams are reflected without being utilized for welding. Most steel materials have a surface exhibiting a reflectance to laser beams of 50% or more. Accordingly, the reflectance should be reduced so as to enhance the laser energy absorbability of the base materials. Approaches to the increase in the laser energy absorbability include (1) utilization of multireflection due to an increased surface roughness, (2) enhancement in laser energy absorbability by the formation of a thin oxide film on the surfaces of the base materials, and (3) utilization of the laser plasma.

Figure 3:
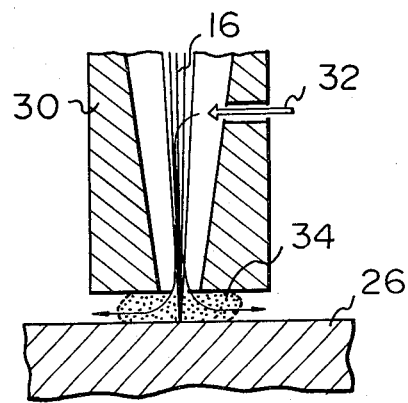
FIGS. 3 and 4 are schematic diagrams of illustrating laser welding procedures in accordance with the present invention in which a gas jet is used in combination with laser beams.
Figure 4:
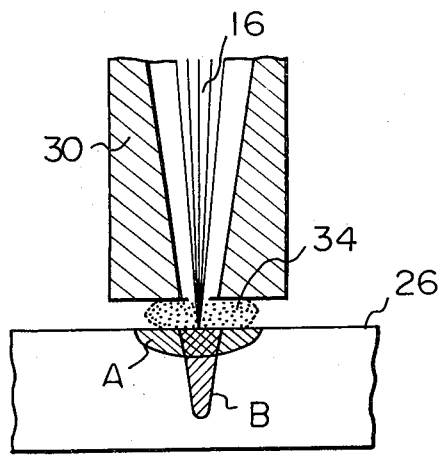

As is shown in FIG. 3, when a gas 32 such as argon (Ar), helium (He) or nitrogen (N$_2$) is introduced into a nozzle 30 through an opening 31 and ejected coaxially with the laser beams 16 through the nozzle 30, the ejected gas is instantaneously heated to an extremely high temperature by the surface layer substance of the material 26 to be worked, which has been vaporized and scattered from the surface of the material 26, so that the mixture of the gas and the vaporized substance forms a plasma 34. That is called laser plasma. When the plasma 34 is generated, the major portion of the energy of the laser beams are absorbed by the plasma, while the remaining minor portion of the energy is directly absorbed by the article 26. On the other hand, when the plasma 34 absorbs the laser energy, the temperature thereof becomes increasingly high. This high temperature plasma forms a secondary source of heating energy which heats the article 26. As a consequence of this, the form of the melted portion of the article is a combined form of a melted portion A due to the plasma 34 and a melted portion B (i.e. a key hole portion and the surrounding portion) due to the incident laser beams, as is shown in FIG. 4.

As described above, when the laser beam welding is effected in combination with the ejection of the gas, the plasma is generated. Then, the energy of the laser beams is absorbed by the plasma, which results in a reduction in the portion of the laser energy directly absorbed by the material. In this case, however, the absorbed energy is extended to the article through the plasma. Accordingly, the energy efficiency obtained in this case is several ten times greater than that obtained when the laser beams are directly irradiated onto the material without using the gas jet, as a result of the reflection of the major portion of the irradiated laser beams. FIGS. 5(a), 5(b) and 5(c) illustrate the above mentioned phenomeno. In FIG. 5(a), no supply of gas is effected and a welding procedure is effected at a welding speed V of 2.5 mm/sec. by using laser beams having a diameter of $W_1$. In FIG. 5(b), a gas jet is supplied so as to generate a plasma and a welding procedure is effected at a welding speed V of 20 mm/S by using laser beams having a diameter of $W_2$. In FIG. 5(c), a gas jet is supplied so as to generate a plasma and a welding procedure is effected at a welding speed V of 2.5 mm/S by using laser beams having a diameter of $W_2$. The net-lined portion indicates the melted portion of the material. As is seen in FIG. 5(a), little melting occurs. Contrary to this, in the case as indicated in FIG. 5(c) wherein the welding speed is the same as that in the case as indicated in FIG. 5(a), a significant melting takes place. Also, even in the case as indicated in FIG. 5(b) wherein the welding speed is approximately ten times that of the case of FIG. 5(a), a deep melting is attained. Of course, even in the case of FIG. 5(a), if the beam diameter is reduced so as to provide a higher energy density, a deeper melting is obtained. However, the melted portion thus formed is no so deep as that in the case of FIG. 5(c).

The generation of the plasma by a combination of the laser beams with the gas jet makes it possible to increase the heat energy efficiency. As is shown in FIG. 4, however, the utilization of the plasma involves the disadvantage in that as the form of the melted portion is influenced by the mass of the plasma, it is impossible to obtain the melted portion in a narrow and deep form which is a characteristic of the laser beam welding procedure. In view of this point, the presence of the plasma is rather harmful, and therefore, the harmful effect of the plasma should be avoided or controlled. The use of the gas jet in combination with the laser beams is also effective for gas-shielding the working portion to be welded, as with the case of the arc welding method. That is, since a gas jet having a high electrolytic dissociation voltage is not easily converted to plasma, the use of a large amount of such a gas (e.g. He) at a high flow rate is effective for controlling the adverse effect of the plasma. As is seen in FIGS. 5(b) and 5(c), increasing the welding speed is also effective for the same purpose. In addition, in order to avoid or control the adverse effect of the plasma, it is effective to blow the gas jet at a high speed toward the working portion of the material so as to divide and disintegrate the plasma.

The present invention also relatres to the treatment of the plasma the present invention contemplates making an effective use of the plasma for welding by pressing the plasma against the base material in a desired direction.

Figure 8:
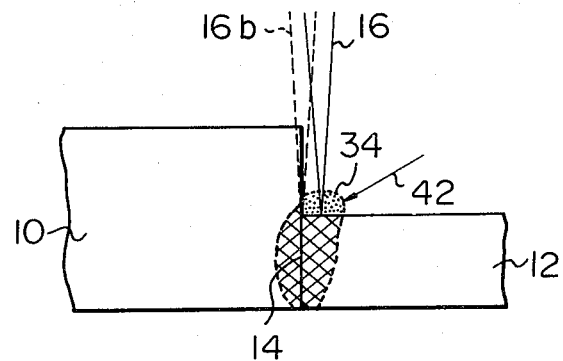
FIG. 8 is a schematic diagram for illustrating laser beam welding procedure in accordance with the process of the present invention in which two base materials having different thicknesses are welded.

The principle of the present invention and the embodiment thereof are shown in FIGS. 6(a) and 6(b) and FIG. 8, respectively.

Referring to FIG. 6(a) in accordance with the present invention, there is provided a nozzle 40 for ejecting a gas jet at an inclination angle with respect to a nozzle 30 for coaxially supplying the laser beams 16 and the plasma-generating, center gas 32. As illustrated by FIG. 6(a), the nozzle 40 is positioned so that its axis points directly at the point on the surface of the article 26 where the laser beams 16 are focused to form a working point. Therefore, the gas jet 42 is ejected toward the surface portion of the article 26 at this working point receiving the irradiation of the laser beams 16, as is shown in FIG. 6(a). The center line $l_2$ of the nozzle 40 or the gas jet 42, makes angles of 2 and $\theta$ to the center line $l_1$ of the laser beams 16, as is shown in FIG. 6(b). That is, assuming that the center line $l_1$ of the laser beams is the z axis and the welding line (the above mentioned butted surface 14) is the x axis, a projection of the center line $l_2$ of the gas jet 42 on the plane defined by the x and z axises makes an angle of $\theta$ to the x axis (90°-$\theta$ to the z axis), and an angle of on the plane defined by the x axis and the y axis, makes an angle of $\alpha$ to the x axis. The angle $\alpha$ may be either positive or negative. When the gas jet 42 is ejected in this manner, the ejected gas jet serves to press the plasma 34 against the surface of the material because the velocity vector of the gas jet has a component in the direction of the z axis, that is, in the direction in which the thickness of the article 26 is measured. As a result of this procedure, a deep melted portion is formed. Also, the velocity vector of the gas jet 42 has components in the directions of the x and y axes. The component x serves to push the plasma 34 against a portion of the base materials to be welded, so that the energy of the plasma is effectively used for heating the portion. This results in an increase in welding efficiency. The component y serves to push the plasma 34 against the left hand or right hand of the welding line F strongly or weakly depending on the value of the angle $\alpha$. This function of the component Y is very effective for welding two base materials having different thicknesses as will be described hereinafter. In addition, when the gas jet is blown in the oblique direction as described above to the plasma mass, the peripheral portion of the plasma mass is cooled by the gas jet and converted to a mere heating gas atmosphere, so that only the center portion of the plasma mass is maintained in the state of plasma, in which portion an active energy implantation to the weld of the base materials is effected. This causes the plasma mass to be minimized, so that, for example, in FIG. 4 the surface area of the melted portion A is reduced and converted to the melted portion B. That is, a narrow, deep melted portion is obtained.

Figure 7A:
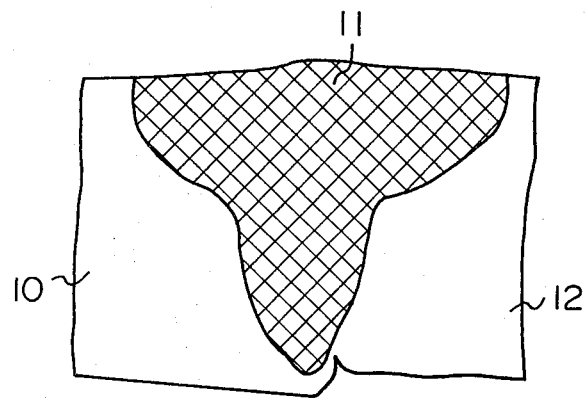
FIG. 7(a) is an explanatory cross-sectional view of the weld obtained by laser plasma welding procedure wherein no control of plasma is effected.
Figure 7B:
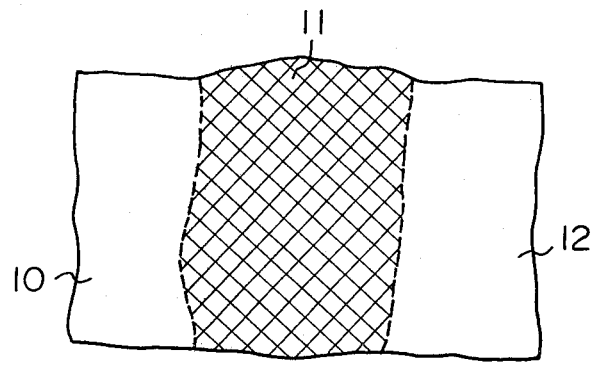
FIG. 7(b) is a cross-sectional view of the weld obtained by the laser plasma welding procedure according to the present invention wherein plasma is controlled.

The plasma-controlling effect of the plasma-pressing gas jet is illustrated with reference to FIGS. 7(a) and 7(b). FIG. 7(a) illustrates a case where no plasma control is effected, while FIG. 7(b) illustrates a case where plasma control is effected. In FIG. 7(a), the melted portion 11 indicated by net lines is in the form of a wine cup. In FIG. 7(b), the melted portion 11 is in the form of a barrel. Comparison of these melted portions clearly indicates that the plasma control is very effective for providing a narrow, deep melted portion as indicated in FIG. 7(b). In this case indicated in FIG. 7a, the plasma-pressing gas jet was ejected at the angle $\alpha$ of zero and the angle $\theta$ of 45 degrees.

FIG. 8 illustrates an embodiment of the present invention wherein two base materials 10 and 12 having a different thicknesses from each other are welded. In various working processes in the iron and steel industry, a number of welding procedures are carried out. For example, after hot rolling, a steel strip is subjected to pickling, annealing and cold rolling procedures. In the practice of these procedures, coils of the steel strip are butt-welded with each other, or a coil of the product steel strip is butt-welded with a leader coil. In the case where the steel strip coil is butt-welded with the leader coil, these coils are different in thickness and, for example, the thickness of the product coil is 6 mm and that of the leader coil is 3 mm. In FIG. 8, the thicker coil is shown as the base material 10, while the thinner coil is shown as the base material 12. If these base materials are to be welded by a conventional laser welding method, the laser beams are irrodiated in the manner as shown by the dotted lines 16b. In this case, the non-welded portion of the base material 10 is melted. In order to avoid this melting, if the laser beams are projected in the manner as shown by the solid lines 16, the portion of the base material 12 which is spaced from the butted surface 14 is melted. In both cases, a satisfactory, welding result can not be attained. Contrary to this, in accordance with the present invention, the plasma 34 is pressed against the base material 10 by using the gas jet 42 ejected at an appropriate inclination angle $\alpha$ directly to the working point of the laser beams so that the jet 42 intersects the beams at the upper surface of the part 12 as shown by FIG. 8. In this case, melted portions are formed bridging both sides of the butted surface and these base materials 10 and 12 can be firmly, welded along the butted surface 14.

Figure 9A:
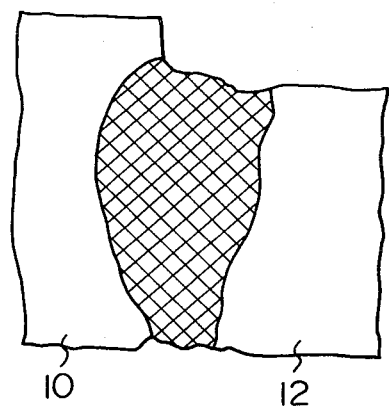
FIG. 9(a) is a cross-sectional view of the weld obtained by the laser beam welding procedure as shown in FIG. 8, when plasma control is unsatisfactory.
Figure 9B:
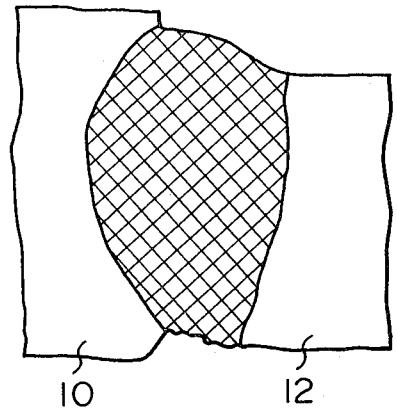
FIG. 9(b) is a cross-sectional view of the weld obtained by the laser beam welding procedure as shown in FIG. 8, when plasma control is satisfactory.

FIGS. 9(a) and 9(b) are cross-sectional views of base materials having different thicknesses from each other, which were welded by the process of the present invention. FIG. 9(a) illustrates a case where the plasma control has been carried out unsatisfactorily, and FIG. 9(b) illustrates a case where the plasma control has been effected satisfactorily. Comparison of these cases clearly indicates that the melted portion can be advantageously shifted by using the plasma-pressing gas jet.

In the case where welding is carried out along a curved welding line it is necessary to change the plasma-pressing direction in response to the welding line. In this case, the gas-ejecting angle $\alpha$ is changed so as to conform to the direction of the curved welding line at the welding point and to push the plasma against the welding portion of the base material. If necessary, the gas ejecting angle $\alpha$ may be made larger or smaller than the tangent thereof, so as to push more strongly the plasma against one of the base materials to be butted.

Figure 10:
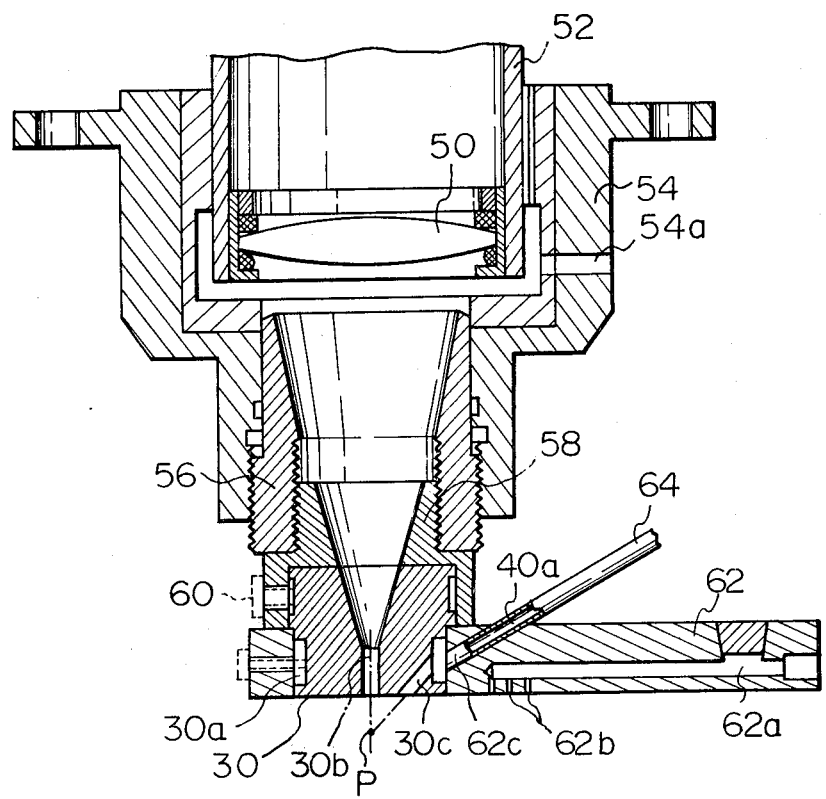
FIG. 10 is a cross-sectional view of an embodiment of a laser beam welding apparatus for carrying out the process of the present invention.

FIG. 10 is a cross-sectional view of a welding nozzle of the present invention. Referring to FIG. 10, a KCL lens 50 through which the convergence and imaging of the laser beams are effected is held by a lens holder 52, and a nozzle 30 is held by holders 54, 56 and 58. The nozzle 30 is provided with a hole 30b through which the laser beams and the gas jet for generating the plasma are projected. The plasma-generating gas is supplied into the nozzle 30 through a gas-supply line (not indicated in FIG. 10) connected to the apparates. The nozzle 30 is fitted to the holder 58 so that in the horizontal plane it can be freely rotated around the longitudinal axis of the hole 30b. The rotation position of the nozzle 30 is fixed by a screw 60. The holder 58 is provided, at the lower portion thereof, with a nozzle 62 for ejecting a shield gas therethrough. The nozzle 62 is provided with a passage 62a for introducing a shield gas, orifices 62b for ejecting the shield gas and a hole 62c for introducing a gas jet. A pipe or hose 64 for supplying the gas jet is inserted into the hole 62c. The nozzle 30 is provided, at the lower peripheral portion thereof, with an annular groove 30a, and the groove 30a is connected to the bottom surface of the nozzle through hole 30c. The hole 30c is designed so as to have a smaller cross-sectional area than that of the hole 30b. Since the hole 62c of the nozzle 62 is opened into the groove 30a, the gas supplied through the pipe or hose 64 is ejected toward a welding point P via the hole 62c, the groove 30a and the hole 30c. Since the nozzle 30 is rotatable, the ejecting angle $\alpha$ of the gas jet can be optionally adjusted through the rotation of the nozzle 30. In the apparatus indicated in FIG. 10, the gas ejecting angle $\theta$ is fixed. In this apparatus shown in FIG. 10, the number of the hole 30c is one. A plurality of holes 30c may be provided so as to adequately change the supply pattern of gas jet.

In the above mentioned welding nozzle, the small-sized, light nozzle 30 is rotatable and the plasma-pressing gas-supplying pipe 64 is a stationary member, that is, it is fixed to the nozzle 62. As a result of this, the gas-ejecting angle $\alpha$ can be easily, controlled by rotating the nozzle 30. In addition, the automatic control of the angle $\alpha$ can be easily carried out by rotating the nozzle 30 by means of as servomotor. This automatic control makes it possible to carry out adequately and automatically the welding procedure, for example, along a curved welding line.

In order to ensure that the hole 30c for ejecting the gas jet functions satisfactorily, the pressure, the pressure distribution, the gas ejecting angle and the type of the gas should be adequately selected. As the plasma-generating gas, helium(He) having a high electrolytic dissociation voltage is more preferable than argon(Ar) or nitrogen($N_2$). The electrolytic dissociation voltage of He is 24.588 V, while that of Ar is 15.760 V and that of $N_2$ is 14.53 V. As the plasma-generating gas, helium(He) is most preferable, because helium is effective for the necessary minimum generation of plasma. It is also preferable that the helium is supplied at a low flow rate. A diatomic molecule gas heated to a high temperature is in a high energy state because it has a dissociation energy and an electrolytic dissociation energy. Since the gas in the above-mentioned state tends to be easily converted to plasma. It is suitable that the gas ejecting angle $\alpha$ is in the range of from $-90°$ to $+90°$ and the angle $\theta$ is in the range of from 30° to 80°. If the angle $\theta$ is close or equal to zero degrees it causes, the plasma to be merely blown away along the surface of the base material. In this case, the result is substantially the same as that obtained when no gas is used, i.e. no plasma is generated.

The process of the present invention can be utilized not only for the welding procedure, but also, for quenching a steel material.

Referring to FIG. 6(a), a nozzle 30 is brought to a location close to a portion of a steel material 26 to be quenched. Laser beams and a plasma-generating gas are concurrently projected toward the quenching portion, while a plasma-pressing gas jet 42 is ejected to the portion. The resulting plasma 34 is pressed against the quenching portion of the steel material 26. The heat of the plasma 34 is transferred to the steel material 26 and diffused into the inside of the steel material 26.

By moving the nozzle 30 along a quenching line of the steel material 26, the surface portion of the steel material 26 can be quenched. In this quenching procedure, the movement of the nozzle 30 causes the quenched portion to be rapidly cooled due to the rapid diffusion of heat into the inside of the steel material 26. Therefore, no annealing phenomenon occurs in the boundary portion between the quenched portion and the non-quenched portion of the steel material.

As mentioned hereinabove, the plasma-generating gas and the plasma controlling gas can be selected from the group consisting of argon(Ar), helium(He) and nitrogen($N_2$). Among these gases, argon(Ar) and helium(He) cause no trouble. However, when nitrogen($N_2$) is used, the heated portion is nitrided. Accordingly, if nitridation is not desirable, it is preferable that the use of nitrogen is avoided.

The present invention will be illustrated by the following examples.

EXAMPLE 1

Two stainless steel strips(SUS304) each having a thickness of 3 mm were butted with each other at the as-sheared ends thereof. The butted surface was irradiated with laser beams through an irradiation hole haivng a diameter of 3 mm by using a laser apparatus as shown in FIG. 10 while ejecting a plasma-generating helium gas through the hole. The laser apparatus had a laser output of 2 kw and was equipped with a focusing lens having a focal distance of 3 inches. Simultaneously with the irradiation of the laser beams, as a plasma-controlling helium gas was jetted to the laser beam-irradiated portion, at a flow rate of 10 l/min through an orifice having a diameter of 1 mm. In this manner, the welding of the butted surface was carried out. In this case, the plasma-controlling gas ejecting angles $\theta$ and $\alpha$ were 45 degress and 0 degree respectively. That is, the plasma-controlling gas jet was ejected along the welding line. Also, as the plasma-generating helium gas was supplied at a flow rate of 20 l/min. The welding speed was 15 mm/sec.

The weld of the stainless steel strips thus welded was evaluated in accordance with a repeated bending test at a bending angle of 90 degrees. The results are shown, below, together with the results obtained by other conventional welding processes.

| Process | The Number of times of repeated bending operations |
| --- | --- |
| The process of the present invention | 43 |
| Laser plasma process (no plasma control) | 10 |
| TIG welding process | 25 |
| SAW welding process | 5 |
| Flash butt process | 16 |

It is clearly apparent from the above mentioned results that the welding strength of the weld obtained by the process of the present invention is remarkably superior to those obtained by other conventional welding processes.

EXAMPLE 2

Two stainless steel strips each having a thickness of 6 mm were butted with each other at the sheared ends thereof. The butted surface was welded according to the same procedures as those described in Example 1, except that the laser output was 5 kw, the focal distance of the focusing lens was 5 inches, the plasma-controlling helium gas was ejected at a flow rate of 15 l/min through a hole having a diameter of 1 mm and the plasma-generating helium gas was ejected at a flow rate of 30 l/min through a hole having a diameter of 3 mm. The ejecting angles $\theta$ and $\alpha$ of the plasma-controlling helium gas were 45 degrees and zero degrees, respectively. The welding speed at which an underbead was stably produced, was determined. The result is shown, below, together with the result obtained by another laser welding process.

| Process | Welding speed |
| --- | --- |
| The present process | 2.1 m/min |
| Another laser welding process | 1.3 m/min |

It is apparent from the above mentioned results that the process of the present invention makes it possible to effect the welding procedure at a welding speed of about 1.6 times that attained by another laser welding process.

EXAMPLE 3

A stainless steel strip having a thickness of 3 mm and a stainless steel strip having a thickness of 6 mm were butted with each other at the mechanically sheared edges thereof. The butted surface was welded according to the same procedures as those described in Example 1, except that the focus of the laser beams was shifted 1 mm toward the strip having a thickness of 3 mm, and the plasma-controlling gas ejecting angles $\theta$ and $\alpha$ were 45° and 90°, respectively.

The weld of the stainless steel sheets thus welded was evaluated according to the same procedure as that described in Example 1. The result is shown together with the results obtained by other conventional welding processes.

| Process | The number of times of repeated bending operations |
| --- | --- |
| The present process | 32 or more |
| Laser welding process | Failed to weld |
| TIG welding process | 15 ~ 20 |
| SAW welding process | 15 ~ 20 |
| Flash butt process | Failed to weld |

It is clearly apparent from the above mentioned results that the welding strength of the weld obtained by the process of the present invention is remarkably superior to those obtained by other conventional welding process.

EXAMPLE 4

The surface of carbon steel strip was quenched by irradiating laser beams at a quenching speed of 15 mm/sec. by using the same laser apparatus as mentioned in Example 1. The surface quenching was carried out under conditions so that the plasma-controlling gas ejecting angles $\theta$ and $\alpha$ were 45° and 0°, respectively, the plasma-generating gas was helium gas ejected at a flow rate of 30 l/min, the plasma-controlling gas was helium gas ejected at a flow rate of 15 l/min, and the shielding gas was argon gas ejected at a flow rate of 30 l/min. In this case, the depth and width of the resultant quenched portion were 3 mm and 3 mm, respectively.

In contrast, when the surface of the same carbon steel strip was quenched by another laser heat treatment process at the same laser output, the depth of the resultant quenched portion was only 1.0 mm.

As detailed described hereinabove, the process of the present invention is characterized by the fact that a gas is supplied together with laser beams to generate plasma and another gas jet is utilized to push the plasma toward a base material to be processed in optional directions including the front of a working point such as welding point and quenching point and the both sides of a working line. As a result, the process of the present invention is advantageous in that the efficiency of energy absorption of the base material is enhanced, the position of the fused portion of the base material can be controlled and the plasma can be minimized so as to obtain a narrow, deep fused portion.

We claim:

1. A laser working treatment process for a steel material, in which laser beams are irradiated to a working point on a steel material while a jet of gas is ejected coaxially with the laser beams to said working point to cause plasma to be generated at the working point, said plasma being pressed against the steel material by ejecting another jet of gas to said working point at an oblique angle to the irradiating direction of said laser beams and the form of said plasma being controlled by changing the ejecting angle of said other jet of gas.

2. A process as claimed in claim 1, wherein said plasma-generating gas is helium.

3. A process as claimed in claim 1, wherein said other gas is helium.

4. A process as claimed in claim 1, wherein said steel material is welded.

5. A process as claimed in claim 1, wherein two steel materials having different thicknesses from each other are welded to each other.

6. A process as claimed in claim 1, wherein said steel material is quenched.

* * * * *